United States Patent [19]

Schartmann

[11] 3,723,829

[45] Mar. 27, 1973

[54] REPETITIVE PULSE GENERATING CIRCUIT

[75] Inventor: Knut Roger Schartmann, Montreal, Quebec, Canada

[73] Assignee: Northern Electric Company Limited, Montreal, Quebec, Canada

[22] Filed: Aug. 16, 1971

[21] Appl. No.: 171,976

[52] U.S. Cl...........317/141 S, 307/138, 317/148.5 R

[51] Int. Cl...........H01h 47/32

[58] Field of Search....317/141 S, 142 R; 307/132 E, 307/138; 179/18 HB

[56] References Cited

UNITED STATES PATENTS

| | | | |
|---|---|---|---|
| 3,483,401 | 12/1969 | Michalski | 317/141 S |
| 2,820,157 | 1/1958 | Rieke | 307/132 R |
| 3,384,790 | 5/1968 | Holec | 307/132 E |

*Primary Examiner*—D. F. Duggan
*Assistant Examiner*—Harry E. Moose, Jr.
*Attorney*—Philip T. Erickson

[57] ABSTRACT

A pulse generator for reversing a d.c. supply at 10 cycles per second for a telephone control circuit uses a relay operated by a transistor either directly or by means of an additional transistor. A timing capacitor is connected to the base of the transistor and the other terminal of the capacitor is switched to ground by the relay after the transistor turns off, and is switched to a charging resistor connected to the power supply after the transistor turns on. When the capacitor is grounded, other contacts of the relay provide a charging path from the power supply through a resistor to the ungrounded side of the capacitor. The first-mentioned charging resistor may be connected to the power supply through R-C filtering. When an additional transistor is used which is of the complementary type relative to the timing transistor, the circuit's tolerance of power supply ripple can be improved by the addition of feedback through a diode.

9 Claims, 3 Drawing Figures

REPETITIVE PULSE GENERATING CIRCUIT

This invention relates to the field of pulse generators and more particularly to pulse generators adapted to produce a series of precisely timed pulses by periodically interrupting a connection to a direct current power supply.

Pulse generating circuits are known that use transistor relaxation oscillators, with or without electromagnetic relays, to provide electric current pulses either for flashing lights or for providing a time base for some kind of electronic system. In many applications the electric power desired in the pulses is such that an electromagnetic relay is advantageously used in the circuit.

Many of the circuits used in the past use the resistance of the winding of an electromagnetic relay operated by the circuit as the principal resistance in the timing circuit, which requires an inordinately large capacitor for timing the pulses. High resistance relays operable on low current are expensive, and besides, the temperature dependence of the relay coil resistance may be a disadvantage when accurately timed pulse repetition is desired. Circuits heretofore used with better timing characteristics have the disadvantage of using two or three transistors in the pulse generating circuit and also more other electrical components.

In a key telephone system it is frequently desired to have at least one telephone distant from the others, as where a professional man has two offices or perhaps desires to have one extension at his residence directly accessible to his business lines, with all the conveniences of a key telephone system, including the ability to hold one call in order to answer another. Pulses transmitted on the conductors connecting the telephones of such a system at some specific repetition rate can provide distinctive signals for control of the circuits at lower cost than conventional tone generators and filters and, besides, the frequencies involved may be confined to the sub-audible range for minimal interference with talking circuits.

In a key telephone system it is important to keep to a minimum the bulk of the control equipment on a customer's premises, as well as to keep down the cost of the equipment so that the personal businesses and small establishments for which such facilities are designed can afford to utilize them. Hence it is desirable to use low resistance relays, small capacitors and 5 percent tolerance resistors, as well as to keep the number of circuit components to a minimum. It is also desirable, in the interest of overall economy to utilize the 24 volt power supply (positive side grounded) which is commonly provided for key telephone circuits, even though such a power supply may have as much as ± 1 volt ripple on its output voltage.

To minimize the number of components, pulses are generated according to the invention by a single transistor associated with a capacitor, the charging circuit of which is adapted to be switched by a relay controlled by the transistor. The relay reverses the direction of charge of the capacitor twice per cycle and also switches between charging path resistors of different values. The charging reversal switching is done in such a way as to use the previous charge to drive further the turning on or turning off, as the case may be, of the transistor.

If the switching function can be accomplished rapidly, on the release as well as on the operation of the relay, or if the circuit is powered by a power supply free of substantial ripple and of sharp transient surges, a one transistor circuit with few components suffices to provide well-timed pulses. Where there are power supply disturbances of the magnitude mentioned above and if the release time of the relay cannot economically be kept very short, it is desirable to add another transistor and make provision to prevent vulnerability of the timing circuit during the release time of the relay. The amplification of the second transistor, however, enables use of either a lower resistance relay, or a smaller capacitor, or both.

In the drawings, which illustrate embodiments of the invention:

Figure 1:
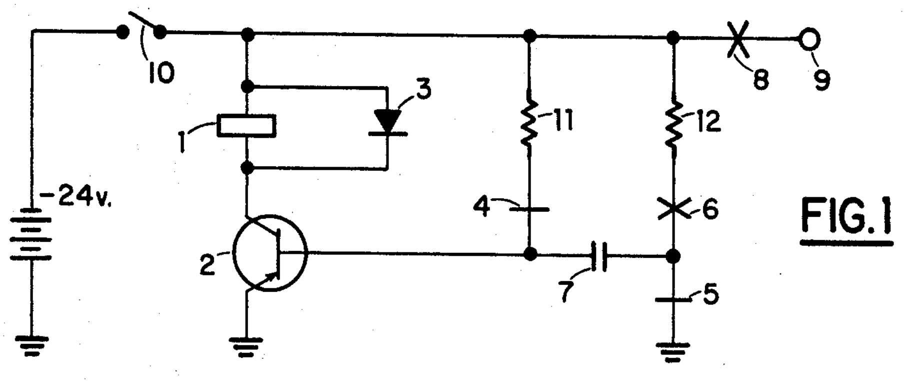
FIG. 1 is a diagram of a pulsing circuit embodying the invention.

In the circuit of FIG. 1, current through relay coil 1 is controlled by transistor 2. Since the inductance of relay coil 1 would develop large voltage surges when the circuit switches, it is necessary to provide the diode 3 in parallel with the relay coil to protect transistor 2 against overvoltage.

Figure 2:
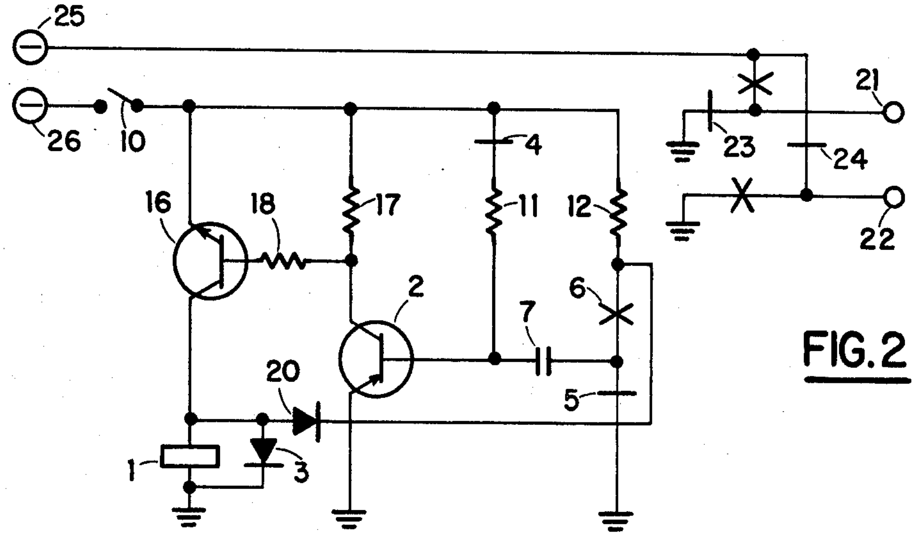
FIG. 2 is a diagram of a modification of the circuit of FIG. 1 having less dependence of timing on the steadiness of the power supply.

Relay 1 has break contacts 4 and 5 and make contacts 6 for switching the timing capacitor 7 in the particular manner described below. An additional pair of make contacts 8 of the relay 1 serves to provide negative battery voltage interrupted by the operation cycle of relay 1 to an output connection 9, to which a circuit is connected (not shown) utilizing the electrical pulses so provided. The contacts 8 illustrate just one of the many ways in which contacts of the pulse generator relay 1 can be used to provide pulses to an independent circuit. In telephone practice the relay is used to break both battery and ground connections of a circuit and, in fact, to reverse battery and ground connections of a circuit by means of transfer contacts of the pulse generator relay, as shown in FIG. 2, thus applying an alternating current of pulsing frequency to the circuit, and not merely a unidirectional pulsing current.

When the negative power supply voltage is applied to the circuit, as by closing the switch 10, capacitor 7 is charged through resistor 11 by virtue of a connection provided by break contacts 4 of relay 1. It charges, of course, towards the power supply voltage, but before it even gets to 1 volt of charge, the base of transistor 2, which is connected to one side of capacitor 7, the other side being grounded over break contacts 5 of relay 1, becomes sufficiently negative to cause the emitter-collector circuit of transistor 2 to pass enough current to operate relay 1. This, of course, is not the full charging cycle, but just what happens beginning with a "cold" start.

The operation of relay 1 disconnects resistor 11 both from capacitor 7 and from the base of transistor 2 and also transfers the side of capacitor 7 that was previously grounded to a new connection to resistor 12, which is connected to the power supply ("negative battery"). This switching operation, by applying negative potential to the formerly grounded side of the capacitor, causes the other side to kick more negative but since the base-emitter junction of the transistor is being forwardly biased and has a low resistance, while the only high resistance in the charging path of capacitor 7 is resistor 12, the charging current (which is at a maximum right after switching and decreases thereafter) quickly develops a voltage drop across resistor 12, which voltage then gradually decreases. Even with the initial rush of this current the base of transistor 2 does not get much more negative than the turn-on point of about 0.6 volts because of the low resistance of the forwardly biased junction.

As charging proceeds, the terminal of capacitor 7 connected to resistor 12 becomes more negative, getting close to the power supply potential while the other terminal of capacitor 7, connected to the base of transistor 2, becomes somewhat less negative than before. The charging current of capacitor 7, weakening as the capacitor approaches full charge, at some point will no longer provide enough base-emitter current to keep the emitter-collector circuit of transistor 2 "turned on". At this point, incidentally, the negative base voltage becomes less than the approximately 0.6 volt magnitude previously mentioned. The operating path of relay 1 is then interrupted by the non-conductive state of the transistor and the relay is caused to release.

Release of relay 1 re-switches the capacitor circuit. The side of capacitor 7 which was almost at power supply potential is suddenly connected to ground. This impresses the capacitor charge on the base of transistor 2 so that the base voltage becomes positive by the voltage to which capacitor 7 had been charged. This turns transistor 2 off hard, making the circuit immune to all minor influences. The release of the relay 1 also reconnects resistor 11 to the junction of capacitor 7 and the base of transistor 2, but this connection to the negative voltage supply can only reduce the positive voltage on the base of transistor 2 by the process of charging capacitor 7 in the opposite direction, which takes time determined by the value of resistor 11.

The normal "off" period charging phase of capacitor 7 begins, therefore, with the application of a positive voltage to the base of transistor 2. As this phase of charging proceeds the potential of the ungrounded side of capacitor goes from a large positive voltage into the range of negative voltage. It cannot continue to anywhere near the power supply voltage, however, because as soon as it gets above about 0.6 volts transistor 2 will conduct and relay 1, operating, will switch the capacitor circuit to the "on" period connection and cause the capacitor to charge in the other direction.

Because capacitor 7 is charged during the "off" period of relay 1 towards a voltage considerably beyond that at which switching takes place, resistor 11 through which it is so charged must be greater than resistor 12 if equal "on" and "off" periods are desired for the relay 1. This is because during the "on" period the charging of capacitor 7 continues until a much higher proportion of full charge (for the applied voltage) is reached. For a ten per second repetition rate and a 50 percent duty cycle, i.e., "on" and "off" periods each equal to 50 milliseconds, capacitor 7 can conveniently have the value of 2 microfarads, in which case resistor 11 should have the value of 50,000 ohms and resistor 12 that of 4,700 ohms.

The rather high positive voltage periodically applied to the base of transistor 2, as well as the considerable negative voltage applied to the collector circuit, requires that a transistor of unusually high voltage limits, such as one of type 2N404A, be used, if the circuit is to work directly from a 24 volt power supply. Of course the circuit can also operate with other transistors and lower supply voltages and with either the positive or the negative side of the power supply grounded. In each case the switching of the capacitor to reverse its direction of charging twice per cycle and at the same time to supply the correct resistance value for each charging phase provides a reliable pulse generator made up of relatively few electrical components.

When the circuit of FIG. 1 is powered in use by a power supply having a large ripple in the voltage (for example ± 3 or 4 percent), as may often be the most economical arrangement in telephone practice, a problem arises if relay 1 does not release promptly when transistor 2 stops conducting.

The release time of relay 1 is somewhat lengthened by the presence of diode 3. The latter protects the transistor 2 from overvoltage by shortcircuiting the back voltage surge that arises when transistor 2 is turned off. In so doing, diode 3 permits the stored energy of the coil to be dissipated by circulating a current through the coil, which gives the relay a slow release characteristic. The release time can be as long as 20 milliseconds. This period is a large fraction of the 50 milliseconds desired as "on" time and as "off" time for relay 1. During those 20 milliseconds, capacitor 7 cannot charge appreciably further because the base-emitter junction soon falls below the forward conduction limit and, hence, thereafter holds just below that limit. A strong surge in the power supply voltage at this time could momentarily turn transistor 2 back on, putting a spurt of current through relay 1 and further delaying the latter's release. The circuit is vulnerable to such surges from about the time transistor 2 is turned off until the relay releases and switches the circuit of capacitor 7.

A solution, shown in FIG. 2, is to apply the ground connection to capacitor 7 electronically during the release time of relay 1 so that as soon as transistor 2 is switched off it is driven hard off by the change of potential applied to the other side of capacitor 7. When relay 1 releases it merely secures the conditions already imposed on that side of the capacitor. The new charging phase of course, cannot begin until relay 1 has connected resistor 11 back into the circuit.

To perform the electronic grounding of capacitor 7 during the release time of relay 1 it is necessary to have more amplification in the circuit, but such amplification can be useful in enabling a relay of lower coil resistance to be used and in reducing the base voltage range requirements of the transistor that operates the relay. In FIG. 2, transistor 2 drives another transistor, 16, being coupled to it by a load resistor 17, which may for example have a resistance of 30,000 ohms, and a base current limiting resistor 18, which is preferably of about 15,000 ohms. Operating with a 30,000 ohm load, transistor 2 does not need to be switched on with so much current as in FIG. 1 and a smaller capacitance can be used for capacitor 7. Transistor 16 is of the complementary type (i.e., NPN type, while transistor 2 is of PNP type) so that this coupling will turn transistor 16 from on to off as transistor 2 goes from on to off, and that likewise when transistor 2 turns on, transistor 16 will turn on. Transistor 16 controls the operating path of the relay 1.

At the collector of transistor 16, the changes of voltage and current are rapid because of the amplification provided by transistor 2. Also, when transistor 16 turns off, the stored energy in relay 1 tends to drive the collector positive, an event that is prevented only by returning the surge to ground potential by diode 3. Hence, the diode 20, connected between the collector of transistor 16 and the connection between resistor 12 and contacts 6 of relay 1 will, so long as contacts 6 remain closed, divert enough of the current that would otherwise flow through diode 3 to bring capacitor 7 from about power supply potential up to ground potential (and then keep it there by sharing current between diode 3 and diode 20). Relay 2 releases before this current entirely stops. In other words, diode 3 assures that the collector of transistor 16 will go positive only enough to provide the forward conduction voltage of diode 3, which is about the same as that of diode 20. at first, diode 20 conducts preferentially until capacitor 7 is brought to ground potential, after diode 3 begins conducting and keeps the collector voltage of transistor 16 from going more positive, and hence also keeping the voltage applied to capacitor 7 through contacts 6 from going positive with respect to ground. Thus, during the period of the release time of relay 1 the base of transistor 2 is impressed with a positive voltage in the same manner as if capacitor 7 had been already grounded through contacts 5, and consequently transistor 2 is turned hard off. In this condition, ripple or surges in the power supply voltage are unable to turn transistor 2 on again.

During the "off" period of relay 1, diode 20 is in its conducting state and permits a small current, limited by resistor 12, to flow through relay 1. This current, being less than 100 microamperes, is far from enough to prevent relay 1 from releasing and of course quite negligible during the relay's "off" period. During the "on" period of transistors 2 and 16, the collector of transistor 16 is generally more negative than capacitor 7 and at any rate not sufficiently more positive to permit diode 20 to conduct.

In the circuit of FIG. 2, capacitor 7 may have the conveniently low value of 0.1 mfd. while resistor 12 should be 510,000 ohms and resistor 11 should be 91,000 ohms to produce 50 milliseconds "on" and 50 milliseconds "off" periods.

In FIG. 2 the output of the pulse generator produces reversals of current direction in a circuit (not shown) that may be connected to terminals 21 and 22 which feed current from a power supply 25 which may be the same as the power supply 26 that energize the pulsing circuit, or which may be a different power supply. When the pulsing circuit is not active, as when switch 10 is open, a steady current can flow in the circuit in question, for terminal 21 is then grounded and terminal 22 is then connected to the negative supply voltage. The legs of the circuit in which the pairs of break contacts 23 and 24 of relay 1 are located is the normal place for the insertion of supervisory relay windings, current limiting resistors and protective diodes or varistors, at least in the case of key telephone system control circuits.

In the circuit of FIG. 2 the operating time of relay 1 creates no problems comparable to the above-mentioned release time problem, because of the different arrangement of the charging path of capacitor 7 in this phase of the cycle. Although the conduction of the base-emitter junction of transistor 2 prevents the capacitor charge from increasing very much, yet any supply voltage dip that occurs merely reduces the potential across resistor 11 of the charging path, which is not much less than the supply voltage. With the built-in "filtering" provided by resistor 11 and capacitor 7, ripple in the power supply during the operate time of relay 1 could not conceivably turn transistor 2 off again.

Figure 3:
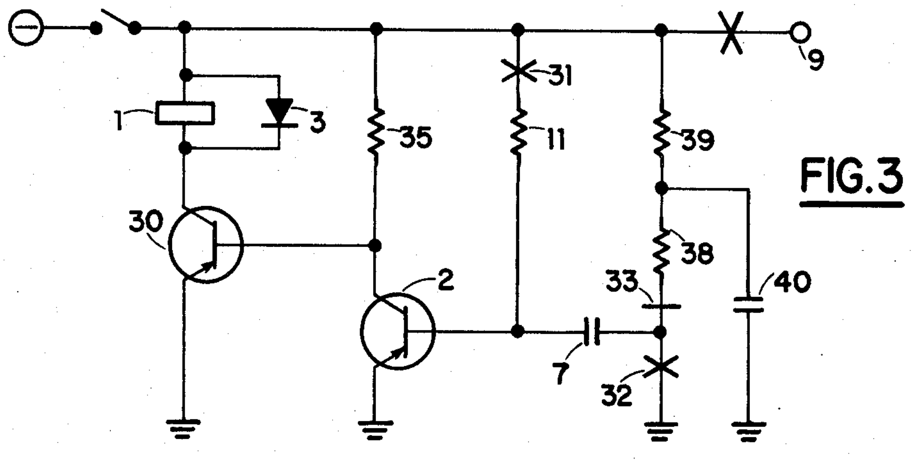
FIG. 3 is a diagram of an alternative modification of the circuit of FIG. 2.

In the circuit of FIG. 3, in which a PNP transistor 30 is used instead of NPN transistor 16 of FIG 2 to drive relay 1, it is the operate time of relay 1 rather than its release time that creates a problem in the presence of power supply ripple, and in this case the problem must be attacked by supplying the filtering action of an additional capacitor 40. Transistor 30 is on when transistor 2 is off and vice versa, and hence for proper operation of the circuit of transistor 2, break contacts 4 and 5 of FIGS. 1 and 2 are replaced in FIG. 3 by make contacts 31 and 32, and make contacts 6 by break contacts 33. The load resistor 35 of transistor 2 is of about 30,000 ohms resistance, like resistor 17 of FIG. 2, so that capacitor 7 can be quite small. In this circuit, unlike FIG. 2, load resistor 35 is in series with the base-emitter junction of the output transistor when the latter is turned on, and hence no counterpart of resistor 16 is needed in FIG. 3.

In the circuit of FIG. 3, during the release time of relay 1, capacitor 7 is at the potential at which the base current of transistor 2 is the current which it would take through resistor 11 if capacitor 7 were not there, with the exception that resistor 11 and capacitor 7 act as a filter for any ripple in the supply voltage, so that charge on capacitor 7 ensures transistor 2 remaining on during any momentary dip in the power supply voltage and of course any momentary increase in the power supply voltage will recharge capacitor 7 against the next dip. As soon as relay 1 releases, of course, transistor 2 is turned hard on because the other side of capacitor 7 is switched from ground to the power supply potential. Thus the timing of the turning on of transistor 2 and the turning off of transistor 30 is relatively immune to ripple in the power supply because of the filtering provided by resistor 11 and capacitor 7.

The timing of the turning off of transistor 2 and the turning on of transistor 30 does not benefit from any filtering by capacitor 7 and for this reason in the circuit of FIG. 3 some resistance capacitance filtering is provided in the charging path to reduce the effect of ripple in the power supply on the timing. Resistor 39 is preferably about one-tenth of the value of resistor 38 and capacitor 40 has about five times the value of capacitor 7. When the release of relay 1 causes transistor 2 to be switched hard on by transferring the grounded side of the capacitor to the power supply potential, the latter connection being through resistors 38 and 39, capacitor 40 is fully charged, that is, it is charged to the power supply potential. Capacitor 7 charges through resistor 38, but because the time constant of the filter comprising resistor 39 and capacitor 40 is shorter than that of the combination of resistors 38 and capacitor 7, resistor 39 has relatively little effect in lengthening the charging time of capacitor 7, whereas it enables capacitor 40 to protect capacitor 7 against the effects of ripple in the power supply. Once the charging current of capacitor 7 becomes less than the small amount of base current in transistor 2 needed to keep the collector circuit of transistor 2 in the on condition, transistor 2 turns off, transistor 30 turns on and relay 1 operates.

It is to be understood of course, that the filtering action provided by resistor 39 and capacitor 40 could also be used in the circuit of FIG. 2, either in addition to or instead of the circuit of diode 20. The diode circuit, however, is the more effective way of preventing disturbance of the timing. For that reason the circuit of FIG. 2 is to be preferred over that of FIG. 3, particularly when the operating time of relay 1 is significantly large.

What is claimed is:

1. A circuit for periodically reversing or interrupting a supply of direct current, comprising:

a. a source of direct current for said circuit having a grounded and an ungrounded terminal;

b. an electromagnetic relay and a transistor connected so that the winding of said relay and the emitter-collector path of said transistor are connected in series between said terminals of said source, said relay having contacts as hereinafter specified;

c. a capacitor connected between the base of said transistor and a transfer contact of said relay;

d. transfer contacts operable by said relay connected to switch said capacitor to ground after said transistor ceases conducting and to switch said capacitor to a charging resistor connected to said ungrounded terminal of said source after said transistor commences conducting, said switching coming after the said changes of state of said transistor at an interval determined principally by the time required for said relay to be moved from one to the other of its positions;

e. a pair of contacts of said relay adapted to complete a charging circuit for said capacitor while said capacitor is grounded by said transfer contact, said charging circuit being thus completed by connection of resistor between the ungrounded terminal of said capacitor and the ungrounded terminal of said source;

f. contacts of said relay adapted to reverse or interrupt periodically a supply of direct current to an electrical system.

2. A circuit as defined in claim 1 in which said capacitor is grounded by said transfer contacts when said relay is in its operated condition.

3. A circuit for periodically reversing or interrupting a supply of direct current comprising:

a. A source of direct current for said circuit having a grounded and an ungrounded terminal;

b. an electromagnetic relay and a first transistor connected so that the winding of said relay and the emitter-collector path of said first transistor are connected in series between said terminals of said source;

c. a capacitor connected between the base of a second transistor and a transfer contact of said relay, said second transistor being connected to drive said first transistor by a direct current coupling;

d. transfer contacts operable by said relay connected to switch said capacitor to ground after said second transistor ceases conducting and to switch said capacitor to at least one charging resistor connected to said ungrounded terminal of said source after said second transistor commences conducting, said switching coming after the said changes of state of said second transistor at an interval determined principally by the time required for said relay to be moved from one to the other of its positions;

e. a pair of contacts of said relay adapted to complete a charging circuit for said capacitor while said capacitor is grounded by said transfer contact, said charging circuit being thus completed by connection of a resistor between the ungrounded terminal of said capacitor and the ungrounded terminal of said source, and f. contacts of said relay adapted to reverse or interrupt periodically a supply of direct current to an electrical system.

4. A circuit as defined in claim 9 in which:

g. said transistors are of complementary types relative to each other, whereby the said direct coupling causes said first transistor to assume the same state as said second transistor;

h. said capacitor is grounded by said transfer contacts when said relay is in its operated condition, and i. a diode is connected between the connection of said relay with said first transistor and the connection between said transfer contacts and said charging resistor, said diode being so poled as to cause the potential applied to said capacitor through said transfer contacts to approach ground potential during the release time of said relay.

5. A circuit as defined in claim 4 in which said charging resistor connected to said transfer contacts is connected to said source through another resistor of lower resistance than said charging resistor and in which a second capacitor is connected between ground and the junction of said charging resistor and said other resistor.

6. A circuit as defined in claim 9 in which:

j. said transistors are both of the same type whereby the said direct coupling causes said first transistor to be conducting when said second transistor is non-conducting and vice versa, and k. said capacitor is grounded by said transfer contacts when said relay is in its unoperated condition.

7. A circuit as defined in claim 3 in which said charging resistor connected to said transfer contacts is connected to said source through another resistor of lower resistance than said charging resistor and in which a second capacitor is connected between ground and the junction of said charging resistor and said other resistor.

8. A circuit as defined in claim 3 in which said charging resistor connected to said transfer contacts is connected to said source through another resistor of lower resistance than said charging resistor and in which a second capacitor is connected between ground and the junction of said charging resistor and said other resistor.

9. A circuit as defined in claim 8 in which said second capacitor is of greater capacitance than the first-mentioned capacitor aforesaid.

* * * * *